(12) United States Patent
Mow (10) Patent No.: US 6,668,045 B1
(45) Date of Patent: Dec. 23, 2003

(54) MESSAGE SCREENING, DELIVERY AND BILLING SYSTEM

(75) Inventor: John Beck Mow, Dallas, TX (US)

(73) Assignee: T-Netix, Inc., Carrollton, TX (US)

( * ) Notice: Subject to any disclaimer, the term of this patent is extended or adjusted under 35 U.S.C. 154(b) by 0 days.

(21) Appl. No.: 09/698,720

(22) Filed: Oct. 30, 2000

(51) Int. Cl.[7] .......................... H04M 1/64; H04Q 7/20
(52) U.S. Cl. ................... 379/88.19; 379/67.1; 379/85; 379/88.12; 379/88.17; 379/88.21; 379/88.22
(58) Field of Search ............................ 379/67.1, 68, 69, 379/70, 85, 88.19, 88.01, 88.02, 88.04, 88.05, 88.12, 88.13, 88.17, 88.18, 88.22, 88.25, 88.2, 88.21; 455/412, 413, 415, 461

(56) References Cited

U.S. PATENT DOCUMENTS

| | | |
|---|---|---|
| 4,001,513 A | 1/1977 | Naylor |
| 4,002,848 A | 1/1977 | Stein |
| 4,188,508 A | 2/1980 | Rogers et al. |
| 4,310,726 A | 1/1982 | Asmuth |
| 4,518,825 A | 5/1985 | Brikerhoff et al. |
| 4,559,416 A | 12/1985 | Theis et al. |
| 4,602,129 A | 7/1986 | Matthews et al. |
| 4,696,031 A | 9/1987 | Freudberg et al. |
| 4,726,057 A | 2/1988 | Doerry et al. |
| 4,799,255 A | 1/1989 | Billinger et al. |
| 4,815,120 A | 3/1989 | Kosich et al. |
| 4,885,765 A | 12/1989 | Shirakawa |
| 4,896,348 A | 1/1990 | Grantland et al. |
| 4,899,375 A | 2/1990 | Bauer et al. |
| 4,901,341 A | 2/1990 | Carter et al. |
| 4,922,519 A | 5/1990 | Daudelin |
| 4,922,520 A | 5/1990 | Bernard et al. |
| 4,924,488 A | 5/1990 | Kosich |
| 4,933,966 A | 6/1990 | Hird et al. |
| 4,933,967 A | 6/1990 | Lo et al. |
| 4,935,956 A | 6/1990 | Hellwarth et al. |
| 4,937,862 A | 6/1990 | Kosich |
| 4,993,068 A | 2/1991 | Poisenka et al. |
| 5,023,869 A | 6/1991 | Grover et al. |
| 5,023,906 A | 6/1991 | Novas |
| 5,033,088 A | 7/1991 | Shipman |
| 5,054,059 A | 10/1991 | Stern et al. |
| 5,063,593 A | 11/1991 | Kwon |
| 5,109,405 A | 4/1992 | Morganstein |
| 5,131,024 A | 7/1992 | Pugh et al. |
| 5,150,357 A | 9/1992 | Hopner et al. |
| 5,163,083 A | 11/1992 | Dowden et al. |
| 5,187,740 A | 2/1993 | Swaim et al. |
| 5,200,995 A | 4/1993 | Gaukel et al. |
| 5,210,789 A | 5/1993 | Jeffus et al. |
| 5,222,120 A | 6/1993 | McLeod et al. |
| 5,229,764 A | 7/1993 | Matchett et al. |
| 5,276,731 A | 1/1994 | Arbel et al. |
| 5,305,312 A | 4/1994 | Fornet et al. |
| 5,309,505 A | 5/1994 | Szlam et al. |
| 5,311,589 A | 5/1994 | Bennett et al. |
| 5,319,702 A | 6/1994 | Kitchin et al. |
| 5,325,427 A | 6/1994 | Dighe |
| 5,327,489 A | 7/1994 | Anderson et al. |
| 5,329,578 A | 7/1994 | Brennan et al. |

(List continued on next page.)

OTHER PUBLICATIONS

U.S. patent application Ser. No. 09/229,385, Cree et al., filed Jan. 1999.

*Primary Examiner*—Allan Hoosain
(74) *Attorney, Agent, or Firm*—Fenwick & West LLP (57) ABSTRACT

The invention is a computerized system that allows inmates of a correctional institution to communicate with parties outside the facilities via telephonic or electronic messaging events. The system provides a means to bill for the events while controlling to whom the inmate can communicate with or from whom they may receive communications, including controlling the method, the length, limited content editing, the frequency of communicating, storage of and the manner of alerting a recipient of a message or receipt thereof.

18 Claims, 9 Drawing Sheets

U.S. PATENT DOCUMENTS

| | | |
|---|---|---|
| 5,345,595 A | 9/1994 | Johnson et al. |
| 5,351,287 A | 9/1994 | Bhattacharyya et al. |
| 5,355,403 A | 10/1994 | Richardson, Jr. et al. |
| 5,375,161 A | 12/1994 | Fuller et al. |
| 5,442,696 A | 8/1995 | Lindberg et al. |
| 5,452,347 A | 9/1995 | Iglehart et al. |
| 5,465,293 A | 11/1995 | Chiller et al. |
| 5,471,519 A | 11/1995 | Howe et al. |
| 5,483,582 A | 1/1996 | Pugh et al. |
| 5,483,593 A | 1/1996 | Gupta et al. |
| 5,497,414 A * | 3/1996 | Bartholomew .............. 379/142 |
| 5,535,261 A | 7/1996 | Brown et al. |
| 5,539,812 A | 7/1996 | Kitchin et al. |
| 5,566,229 A | 10/1996 | Hou et al. |
| 5,583,934 A | 12/1996 | Zhou |
| 5,606,604 A | 2/1997 | Rosenblatt |
| 5,617,471 A | 4/1997 | Rogers et al. |
| 5,627,887 A | 5/1997 | Freedman |
| 5,651,056 A | 7/1997 | Eting et al. |
| 5,655,013 A | 8/1997 | Gainsboro |
| 5,722,418 A * | 3/1998 | Bro ............................. 128/732 |
| 5,724,404 A | 3/1998 | Garcia et al. |
| 5,742,905 A * | 4/1998 | Pepe et al. .................. 455/461 |
| 5,745,553 A | 4/1998 | Mirville et al. |
| 5,796,811 A | 8/1998 | McFarlen |
| 5,799,068 A | 8/1998 | Kikinis et al. |
| 5,805,685 A | 9/1998 | McFarlen |
| 5,809,125 A | 9/1998 | Gammino |
| 5,883,945 A | 3/1999 | Richardson et al. |
| 5,943,403 A | 8/1999 | Richardson et al. |
| 5,946,386 A * | 8/1999 | Rogers et al. .............. 379/265 |
| 5,960,064 A | 9/1999 | Foladare et al. |
| 6,052,454 A * | 4/2000 | Kek et al. ................... 379/188 |
| 6,064,963 A * | 5/2000 | Gainsboro .................. 704/270 |
| 6,072,860 A | 6/2000 | Kek et al. |
| 6,141,406 A | 10/2000 | Johnson |
| RE37,073 E | 2/2001 | Hammond |
| 6,188,751 B1 * | 2/2001 | Scherer ..................... 379/88.2 |
| 6,366,653 B1 | 4/2002 | Yeh et al. |
| 2001/0036821 A1 * | 11/2001 | Gainsboro et al. .......... 455/410 |

\* cited by examiner

External Party Leaving or Picking Up A Voice Message

Figure 1A.

Inmate Depositing A Message
Figur 3A.

Inmate Depositing A Message
Figure 3B.

Network Processes Diagram
Figure 5.

MESSAGE SCREENING, DELIVERY AND BILLING SYSTEM

BACKGROUND—FIELD OF INVENTION

This invention deals with allowing certain people, such as families, friends and attorneys, to communicate with an inmate in a correctional institution utilizing a variety of messaging forms when direct telephone contact or personal visits are deemed untimely, expensive or cannot be conducted.

BACKGROUND—DISCUSSION OF PRIOR ART

Inmates at correctional facilities are typically allowed visitors at scheduled times with controlled visiting hours. Families sometimes find it difficult to travel frequently to the institution for visits and foreign inmates sometimes never receive visitors. Depending upon the facility, it is also deemed difficult to escort an inmate and/or deliver items to them.

Inmates may be allowed outward telephone calls billed on a collect call basis to the called party (U.S. Pat. No. 4,935,956), or may have a prepaid method of billing, paid for by the inmate. Collect and prepaid inmate calls are generally very expensive with a large portion of the gross revenues for inmate calls given to the prisons as commissions by the service provider. A service provider may be a large telephone company or other independent company. Service providers install the telephone equipment and maintain it for the length of a contract, generally 3–5 years or more. They are also responsible for billing and collecting the monies for collect calls. They make their money by completing the call as a 1+ direct dialed call but billing it at high operator assisted collect call rates which can reach as high as over $5.00 for the first minute and $0.89 a minute thereafter. Collect call billing has to be collected from the called party generally by their local telephone company. Fraud and non-payments can run as high as 30–40% if fraud control measures are not invoked by the service provider.

Institutions generally leave fraud resolutions to the service provider and collect a fixed commission on the gross billed revenues. The commission rate is frequently the highest priority in determining the service provider in the institution's public bidding process.

Inmate families complain about the high cost of inmate calls. Many people who receive calls or call attempts from inmates desire to have their telephone numbers blocked for various reasons, and the service providers block many numbers that do not pay their collect call telephone bills or that cannot be billed for calls, such as payphones.

Inmate telephone calling completion rates typically are only 30–35% of all attempted calls which indicates that many called parties are not at home during the restricted hours that inmate are allowed to make calls or that inmates simply call anybody, anytime and hope to complete a call. Inmates continually attempt ways to break or fraud the system resulting in many new restrictive feature enhancements over time. Furthermore, international calls may be prohibited entirely if the correctional facility so imposes, which may be because there is no method of collection for collect calls with foreign telephone companies or the current inmate telephone system doesn't allow prepaid calls. Furthermore, many indigent inmates do not have the money for prepaid calls or the institution does not provide prepaid services because of the administrative overhead associated with assigning a PIN number and managing the accounting aspect of prepaid calls, No inbound electronic communications to inmates is permitted today because of security reasons. There are a variety of methods of communicating via messages that may help solve the high cost problem of inmate calls and the inability to complete a telephone conversation or arrange a personal visit.

Voice message systems (U.S. Pat. No. 4,652,700) are common in all walks of life except in the corrections industry, as is the explosion of email communications via the Internet. Many telephone systems have integrated voice mail systems or adjunct versions and can accept data messages such as email and fax. These versions almost never restrict message volume or content of incoming or outgoing messages, or who can leave a message, and almost never reverse the charges to the remote party. Email systems are restricted by who has an email address at a facility, but restricting who can send a message or editing of these messages to eliminate certain words or subjects is generally never performed. Some systems exist that allow combining email text-to-speech and voice messages, but without the types of controls correctional facilities desire. Message delivery systems (U.S. Pat. No. 4,766,604) are available but not very popular because of the difficulty of reaching the party or in dealing with an answering machine.

Wordspotting (U.S. Pat. No. 5,199,077) is a method to help control the content of recorded voice mail messages. This process is becoming more reliable as technology improves. Wordspotting can assist in searching recorded voice mail messages for certain words or subject matter that institutional investigators want to be informed about, but results can be extremely poor in many environments. The technology is still being perfected.

A system does not exist that embodies these elements together in one system, i.e. message delivery, message deposits, email sending and receiving either audibly or in text form, with the restrictive calling rules correctional facilities are generally requiring.

This invention provides a methodology of communicating via message format with restrictive controls that can be billed in an economical manner that can still generate revenues for the correctional facilities and lower rates for the families. Increased messages may also provide a form of rehabilitation for loved ones which is another common complaint. While some people feel that no communications with people who break the law should be the norm, others feel that most inmates have to have some form of outside contact to help them rehabilitate and endure the incarceration period, providing hope for the future when they are released.

Correctional facility inmate telephone economics has not been a large subject of study, but it has been proven in other economies that if more forms of communications are allowed, information flow and revenues increase. Some service providers have expressed concern that such a messaging system could significantly reduce the existing telephone call revenues. There is fear that inmates will use more communications to continue their crime life behind bars. Messaging systems may actually provide more security measures than direct dialed telephone conversations that are in real time.

This invention provides a means to address these opportunities and concerns with flexible hardware and software elements.

OBJECTS AND ADVANTAGES

Accordingly, several objects and advantages of this invention are that inmates can utilize new methods of communicating with outside friends or family members with the same or enhanced screening methods found in today's inmate telephone systems resulting in easing the complaints of inmate families as to cost and accessibility. Geographical boundary restrictions of telephone calls can be overcome by the fact that messages can be picked up or left by external parties who may be located anywhere in the world. Inmates from foreign countries consequently can communicate frequently with parties located up to 12 time zones away. Furthermore, with the explosion of email messages, controlled and edited emails can be exchanged with people world wide, with text-to-speech conversion when inmates do not have access to computer terminals. The invention expands the methods of communications to and from inmates, can solve some of the family complaints of desiring more frequent and lower priced communications and can satisfy the security requirements of the correctional facilities.

SUMMARY OF INVENTION

The invention provides a computerized system that allows inmates of correctional institutions to communicate with parties outside the facility via telephonic or electronic messaging without the parties having to communicate with each other in real time and/or over the same communication connection. Embodiments of the invention provide a computerized system that administers billing for the communications and controls who the inmates can communicate with and/or from whom the inmates can receive communications. The system may further provide content editing and also control the frequency of communications, the length of messages, and the manner of alerting a party to a new message or the receipt of a previously sent message.

Embodiments of the invention provide a computerized telecommunications system that controls a plurality of message communication types originating from and/or received by inmates in a correctional institution. Each inmate has a personal identification number ("PIN") and/or email address. In at least one embodiment, the system screens messages using an "allowed call list" of telephone numbers and/or email addresses associated with the PIN. The allowed call list comprises those numbers or addresses that the inmate may send and/or receive messages. Further screening options include using the inbound caller-ID or Automatic Number Identification ("ANI") information obtained automatically from the inbound telephone call, matching the inbound ID with an "allowed ID list" for each PIN number that identifies the caller's telephone number and location ID to allow a message to be completed. Still further screening options include an "activity guard" process whereby if the message count for the PIN exceeds a certain quantity within a certain time frame, or whereby if the message count from a particular inbound party exceeds a certain quantity within a certain time frame, message communications will not be allowed.

In another embodiment of the invention, a voice mailbox is automatically created for each "allowed call list" entry such that the entry's associated party (e.g., an inmate's family) may then call into the system via any one of a plurality of telephone circuits and access a mailbox to retrieve a message from a PIN holder, or leave a message for a PIN holder (e.g., the inmate relative). Accordingly, multiple mailboxes may be created for the same entry if the entry appears in more than one inmate's "allowed call list."

In a further embodiment of the invention, all messages are recorded in a digital media format for archival purposes. Trained system personnel may search and retrieve messages using a plurality of search keys such as by PIN, date, and time. The system may prevent the playback of the messages from sources class-marked as "privileged," such as attorney-client privilege messages. For these messages, once a message is delivered and reviewed, it may be automatically deleted.

In another embodiment of the invention, an inmate is alerted that new messages have been received using at least one of a plurality of alerting methods. Some alerting methods occur when the inmate attempts to use the institutional telephone system. For example, an audio alert or prompt informs the inmate of new and/or old stored message(s). Another inmate alerting method comprises sending a signal to a closed circuit TV system that places the message alert on one or more TV screens in the institution, or to other types of electronic notification units located within the institution, and yet another method of alerting the inmate comprises sending a signal to a paging unit that pages an inmate.

A further embodiment of the invention comprises allowing the inmate to listen to the messages that have been stored for a PIN number once those messages have passed the screening tests. In this embodiment, the email messages may be converted to audio using a text-to-speech conversion process.

A still further embodiment of the invention pertains to the billing of messages. In one method, the messages are billed on a prepaid basis, with the charge for each message being subtracted from a previously established account balance for the PIN. The email messages have a fixed or variable charge based on character or word count, for example. If the prepaid account balance reaches zero, the messages will be blocked. In another method, message billing is performed on a collect-call basis that comprises validating a calling or recipient party's telephone number or email-to-telephone number conversion against a blocked billing number database(s) to determine if the telephone number is in the blocked billing number list. The method uses a negative list such as "LIDB" (the Line Identification Database, a validation database for caller ID, calling cards, and collect calls), then creates a data record for each message put into a format, such as the Exchange Message Interface ("EMI"), that is sent to a telephone company or third-party billing service for collection.

In another embodiment of the invention, an inmate originates a voice message by entering a PIN number or employing voice print recognition to identify the inmate, speaking or entering a recipient's telephone number, recording a recipient's name as a label, and then recording a message. A plurality of methods may be used to alert the recipient that a message has been left or that a message stored in the system is awaiting delivery to its intended recipient. Alerting methods include paging system notification, email notification, and alerting being via an outbound automated telephone voice announcement or a fax delivered to a predetermined number.

In a still further embodiment of the invention, the intended recipient may retrieve a deposited message by calling the system's telephone number, entering a combination of his/her own telephone number and the inmate's PIN number and/or other unique access codes. Alternatively, the recipient may retrieve messages by speaking the numbers or codes using speech recognition techniques to convert the speech into system recognizable numbers. This method may optionally use the ANI/Caller-ID information for verification to pickup the message.

In another embodiment of the invention, the system scans voice messages using a wordspotting process that detects certain key word utterances. If key words are detected, then an alert to institutional officials is performed. The system may send incoming or outgoing email messages using similar screening techniques to those applied to voicemail messages. Incoming emails are delivered to a workstation if the inmate's PIN number class of service so specifies, with text editing of the emails performed to restrict certain words or subject matter that may be in a "restricted word list" in the system. Accordingly, only screened text messages are communicated in this embodiment of the invention

DESCRIPTION OF INVENTION

Figure 5:
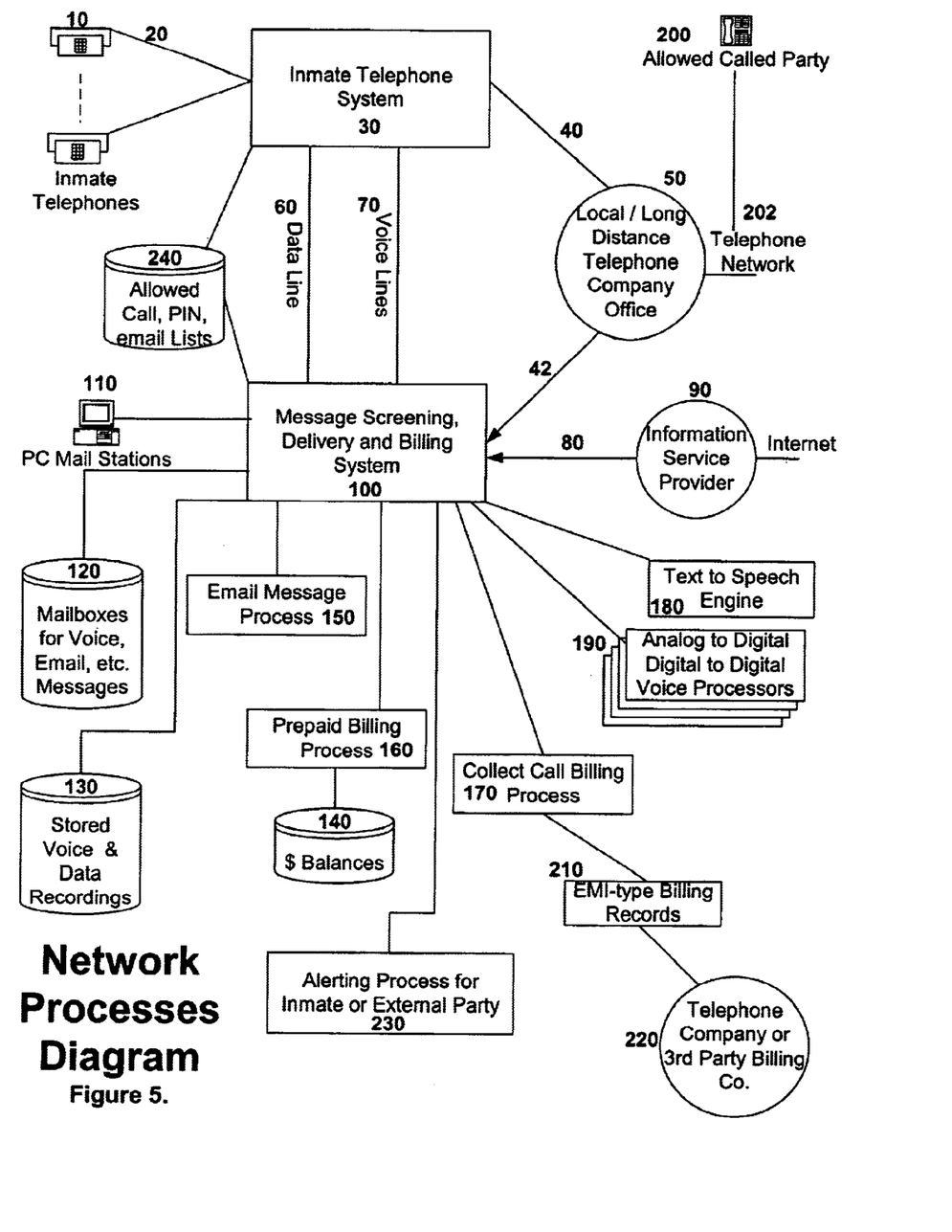
FIG. 5 is the Network Process Diagram showing the relation of the system to an Inmate Telephone System and various process boxes.

FIG. 5 is a block diagram of the general processes involved with the Invention.

Figure 1A:
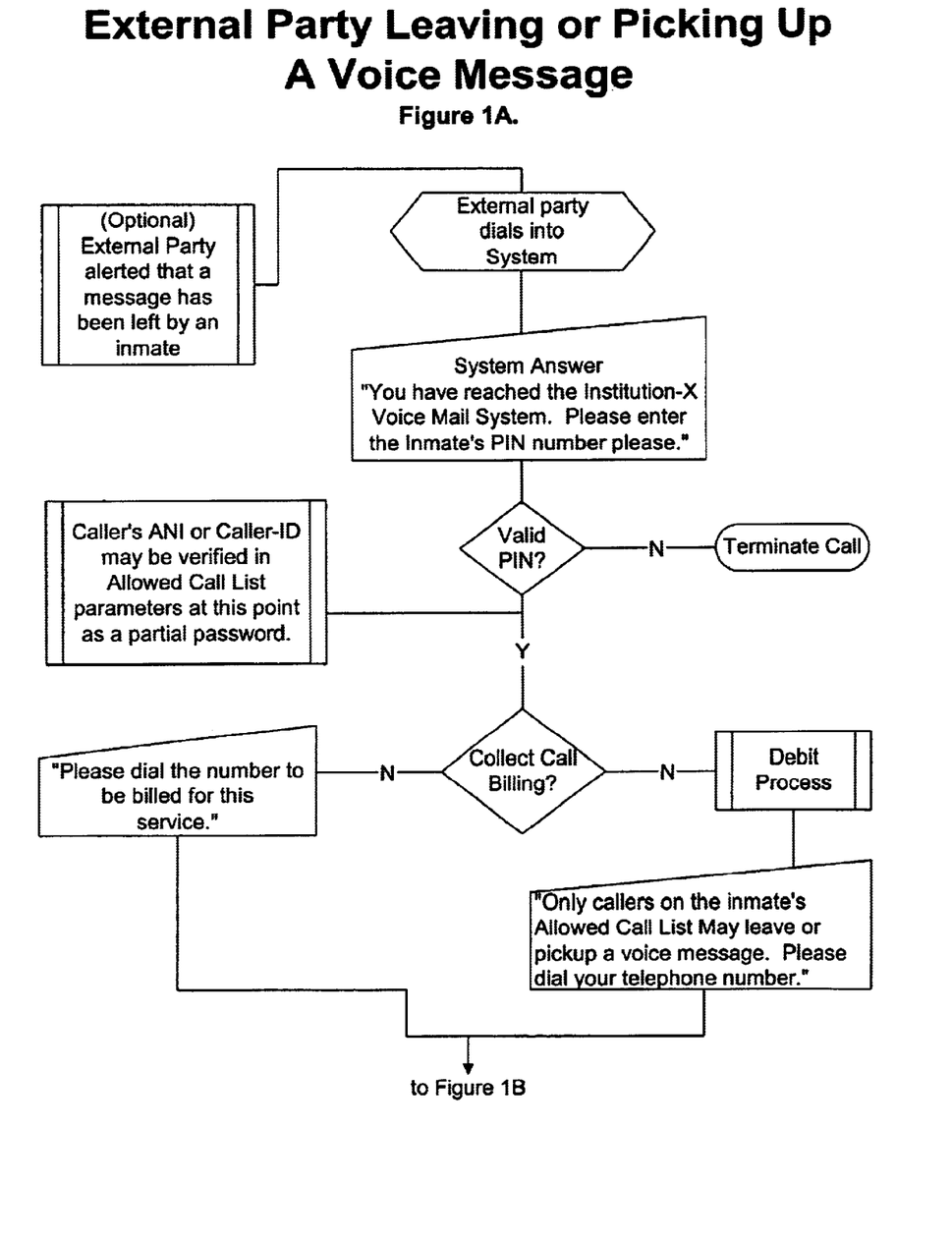
FIG. 1 is a flowchart of an external party leaving or picking up a voice message with various screening options.
Figure 1B:
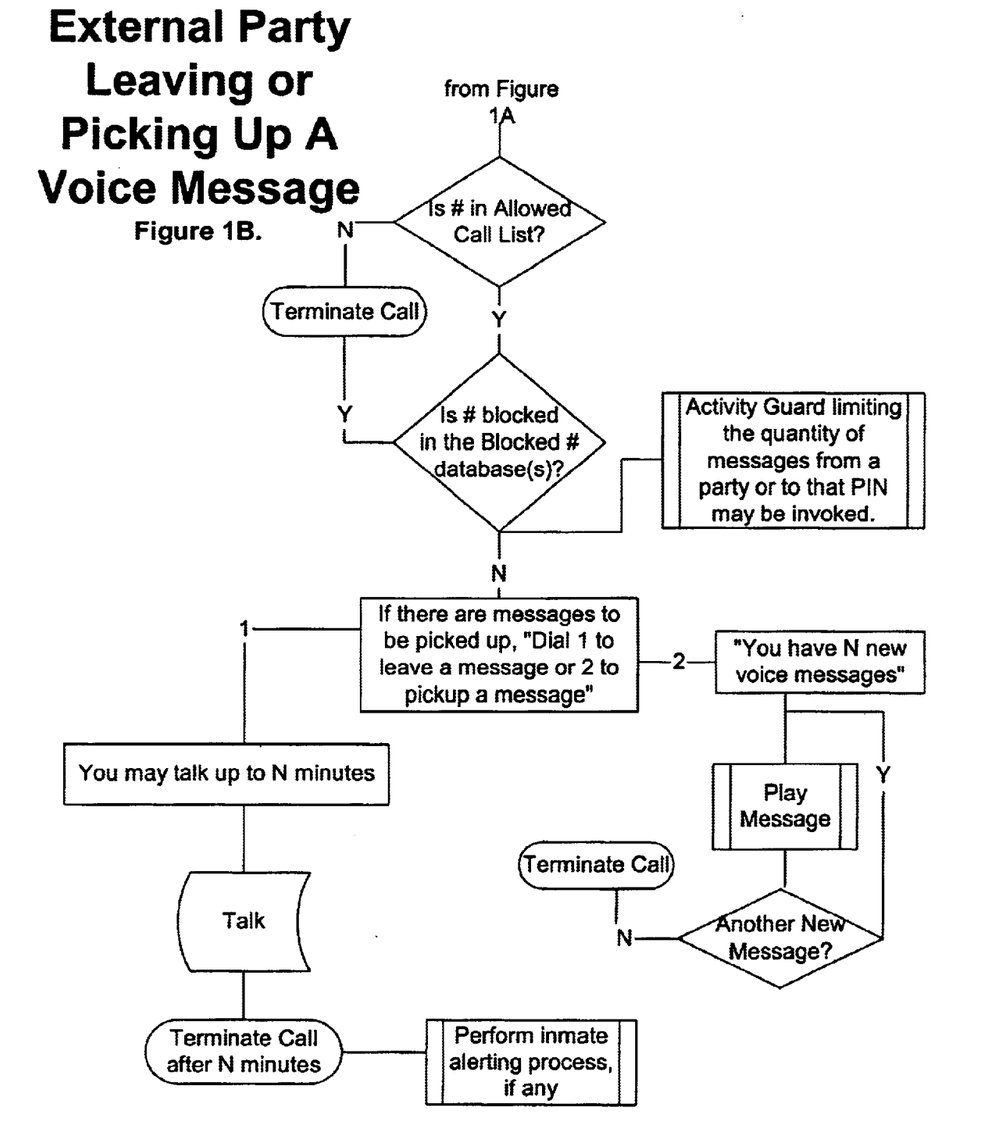

FIG. 1 shows the flowchart of an external, allowed called party 200 calling into the Message Screening, Delivery and Billing System 100 via the public telephone network 202 connecting via the local or long distance telephone company office 50 that serves the correctional facility where the inmate telephone system 30 is located connected to a System 100, both connected via a plurality of analog or digital telephone circuits 40 and/or 42 between them. One skilled in the industry will recognize that the Inmate Telephone System 30 and the System 100 can be integrated into the same architecture which could combine telephone lines 40 and 42 as well as inter system lines and data circuits 60 and 70 or that a System 100 could be remotely located.

When the Allowed Called Party 200 dials into the System 100, they are required to dial an inmate's PIN that is stored in a database 240. The database may be shared or stand separately from the Inmate Telephone System 30 database. Once the PIN and allowed call lists 240 are verified, the caller's mailbox 120 is checked for messages and played in audio form to the caller through the voice processor processors 190. If the caller desires to leave a message for the PIN holder, the voice is processed by the voice processors 190 and the recording is stored in the PIN mailbox 120 and archived in the stored voice and data recordings database 130. The inmate alert process 230 may be performed. If the type of billing is prepaid, then the prepaid billing process 160 debits the call amount from the PIN balance 140. If the type of billing is collect, then the collect call billing process 170 is exercised and a call detail record is created which is converted to a record type, such as EMI 210, which can be sent to a telephone or $3^{rd}$ party billing company 220 for collection.

Figure 2A:
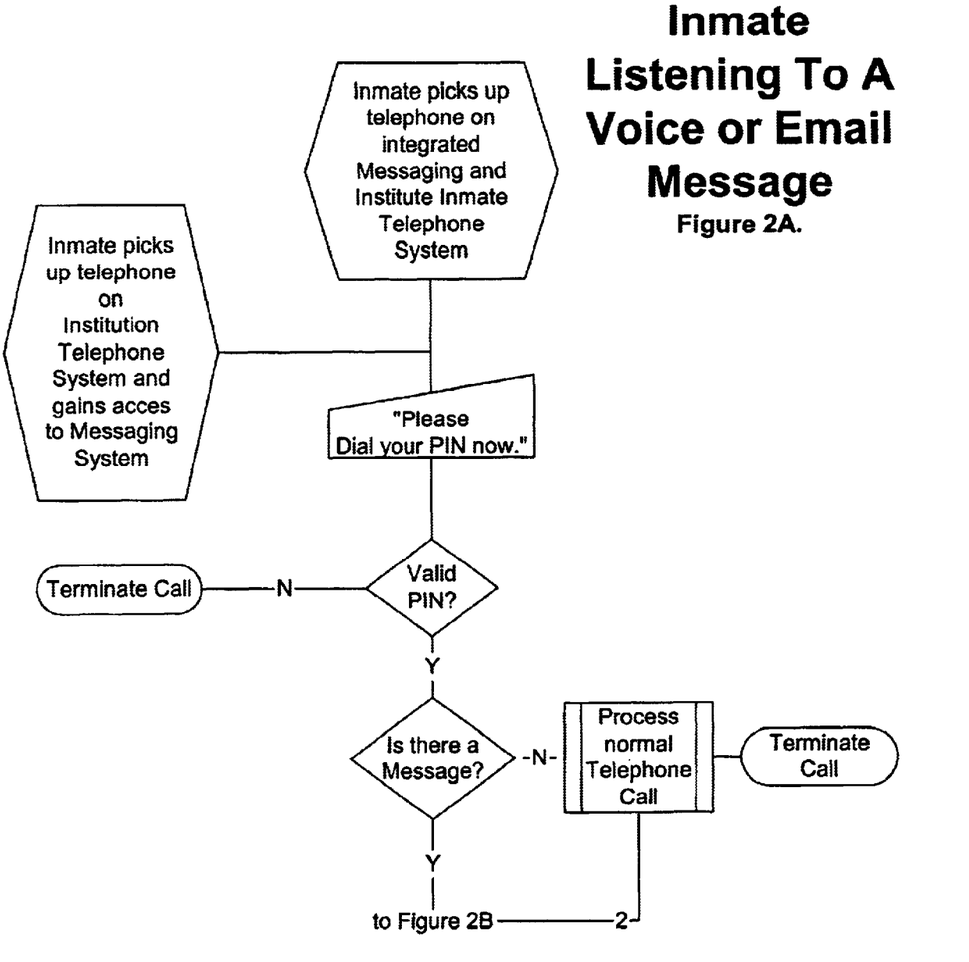
FIG. 2 is a flowchart of a resident listening to a voice or email message.
Figure 2B:
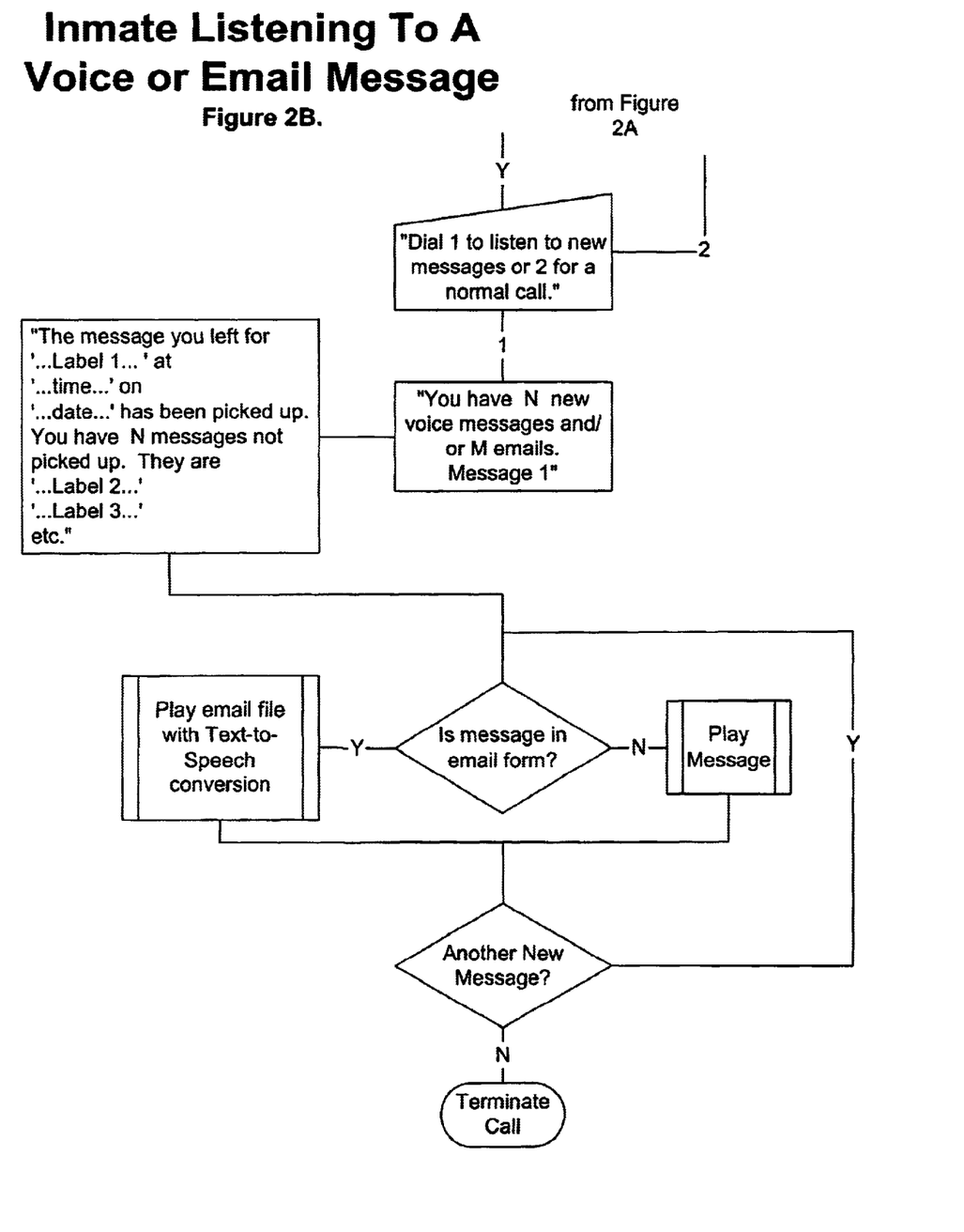

FIG. 2 outlines an inmate using an inmate telephone 10 connected to the Inmate Telephone System 30. If a message has been received 120, the System 100 sends the alert to the Inmate Telephone System 30 via a data line 60 connected in plurality of ways. When the inmate receives the audio alert from the Inmate Telephone System 30 the inmate can dial access the System 100 being connected either via dedicated circuits 70 or by a connection which proceeds over circuits 40 to the telephone company 50 and then connected to the System 100. After validating the inmate's PIN in the database 240, stored messages can be played from the PIN mailbox 120 via the voice processors 190 to the inmate 10 with email messages being processed by the text to speech process 180. Further announcements from the System 100 to the inmate 10 may occur for the purpose of informing the inmate if previous message deposits have been delivered or picked up by an allowed called party 200.

Figure 3A:
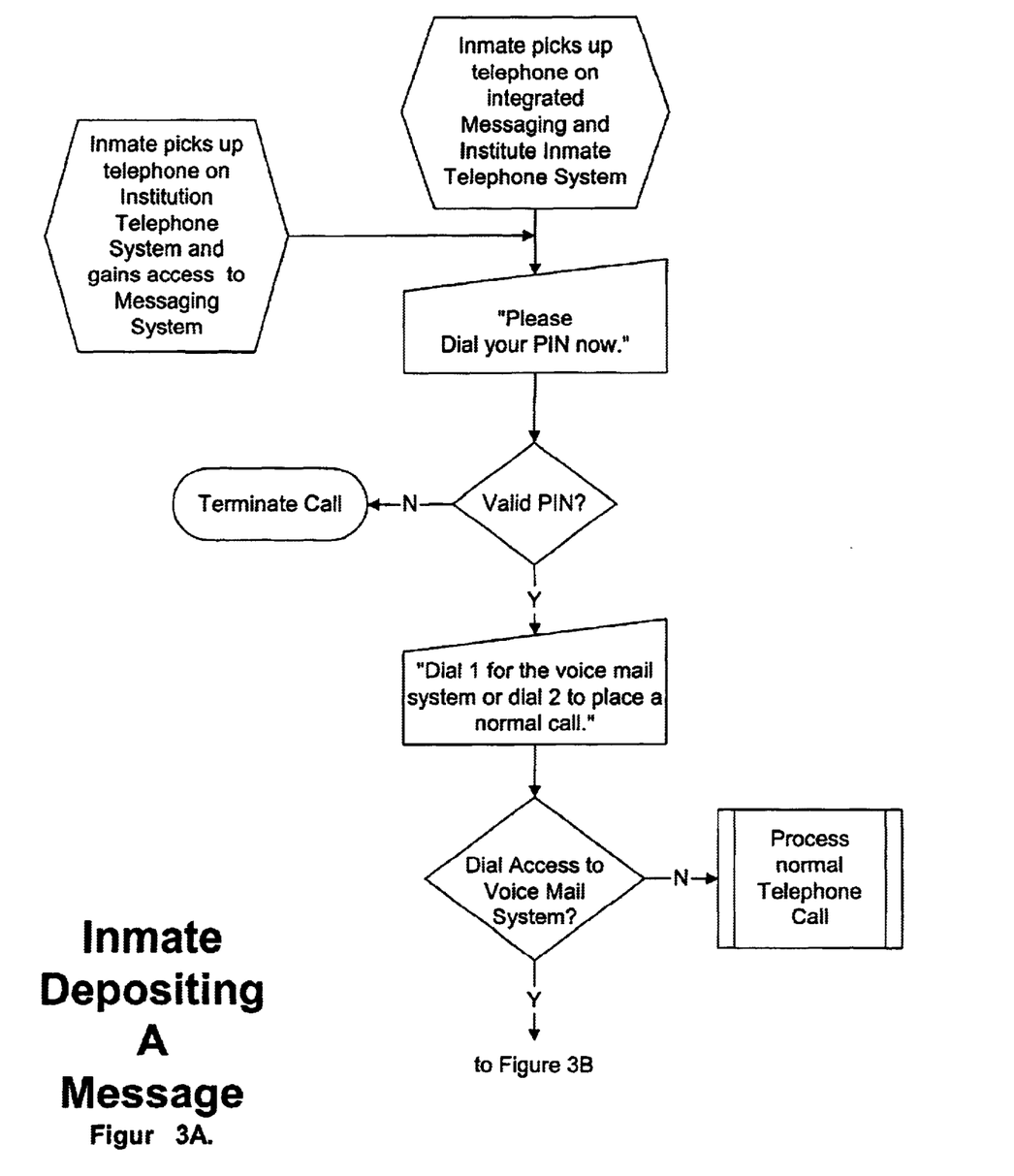
FIG. 3 is a flowchart of an inmate depositing a message to be picked up or delivered to an outside party.
Figure 3B:
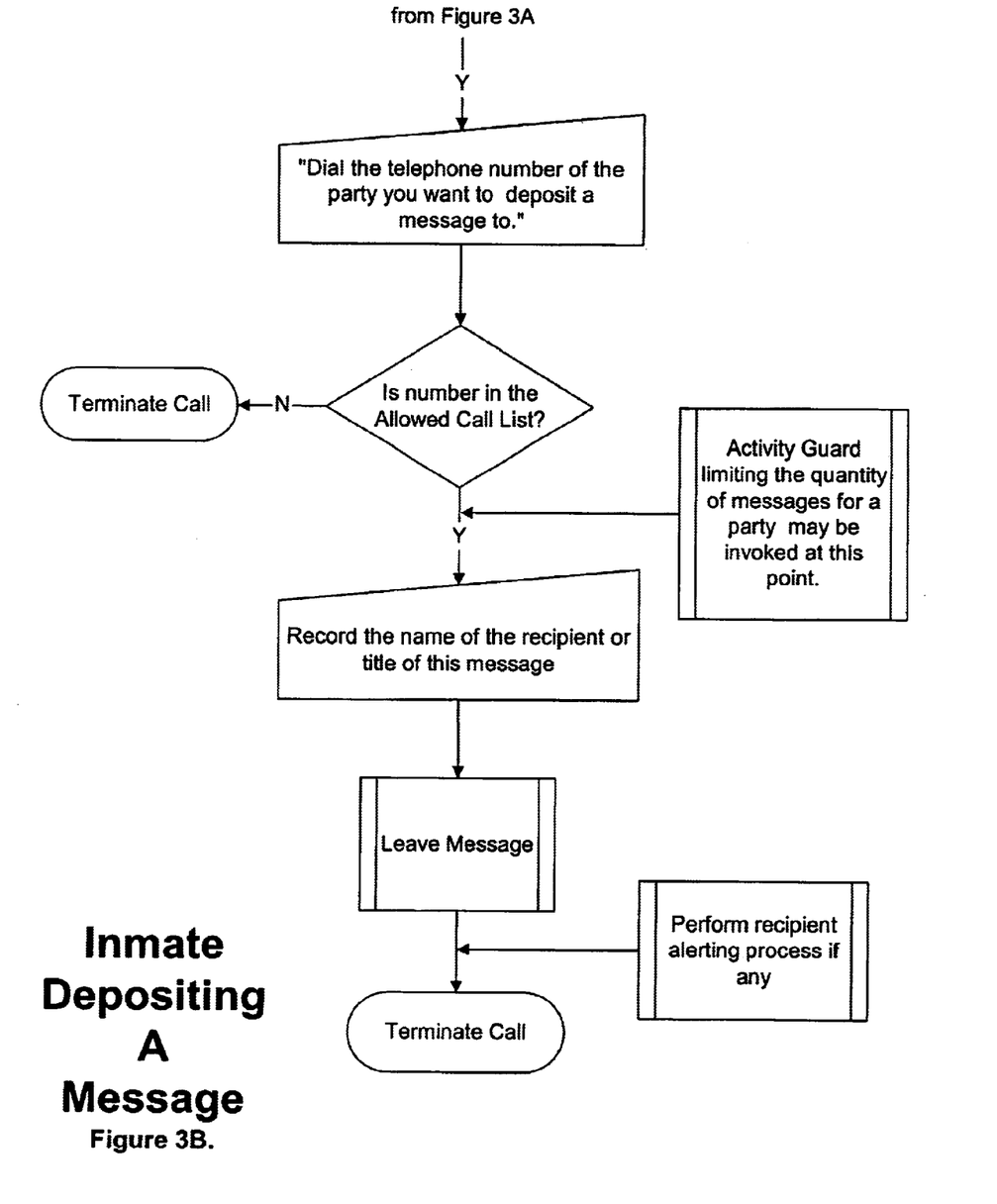

FIG. 3 outlines an inmate using an inmate telephone 10 connected to the Inmate Telephone System 30. If the inmate 10 desires to deposit a message into an allowed call list mailbox 120, a connection process to the System 100 ensues as described for FIG. 2. The inmate then dials the allowed call list number 240 with screening processes for the allowed call 240 and either a prepaid billing 160 or collect call billing 170 process before depositing a message through the voice processors 190 to a mailbox 120. The recipient alert process may be performed 230.

Figure 4A:
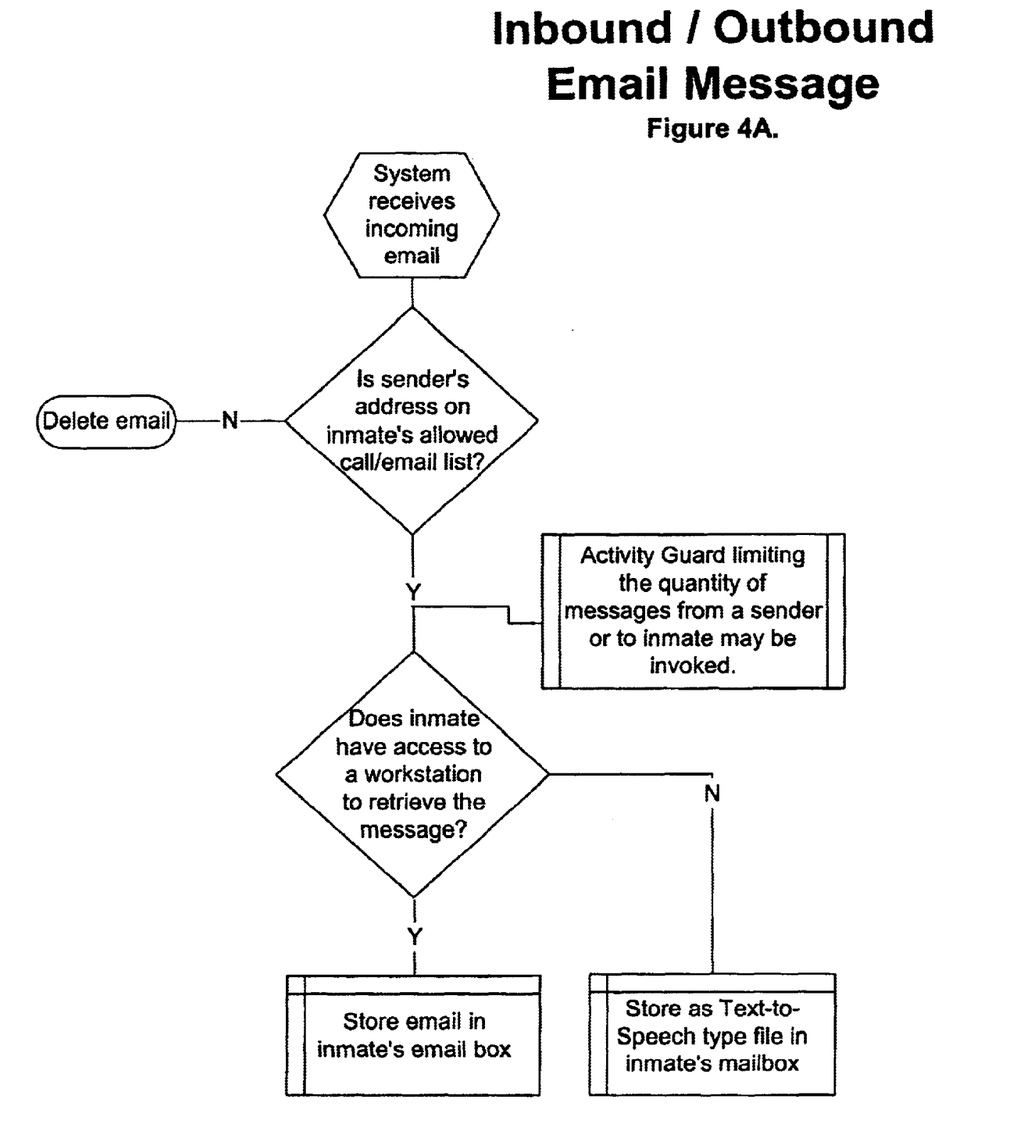
FIG. 4 is a flowchart of an inbound email message being distributed to the proper mailbox and an outbound email being edited and sent.
Figure 4B:
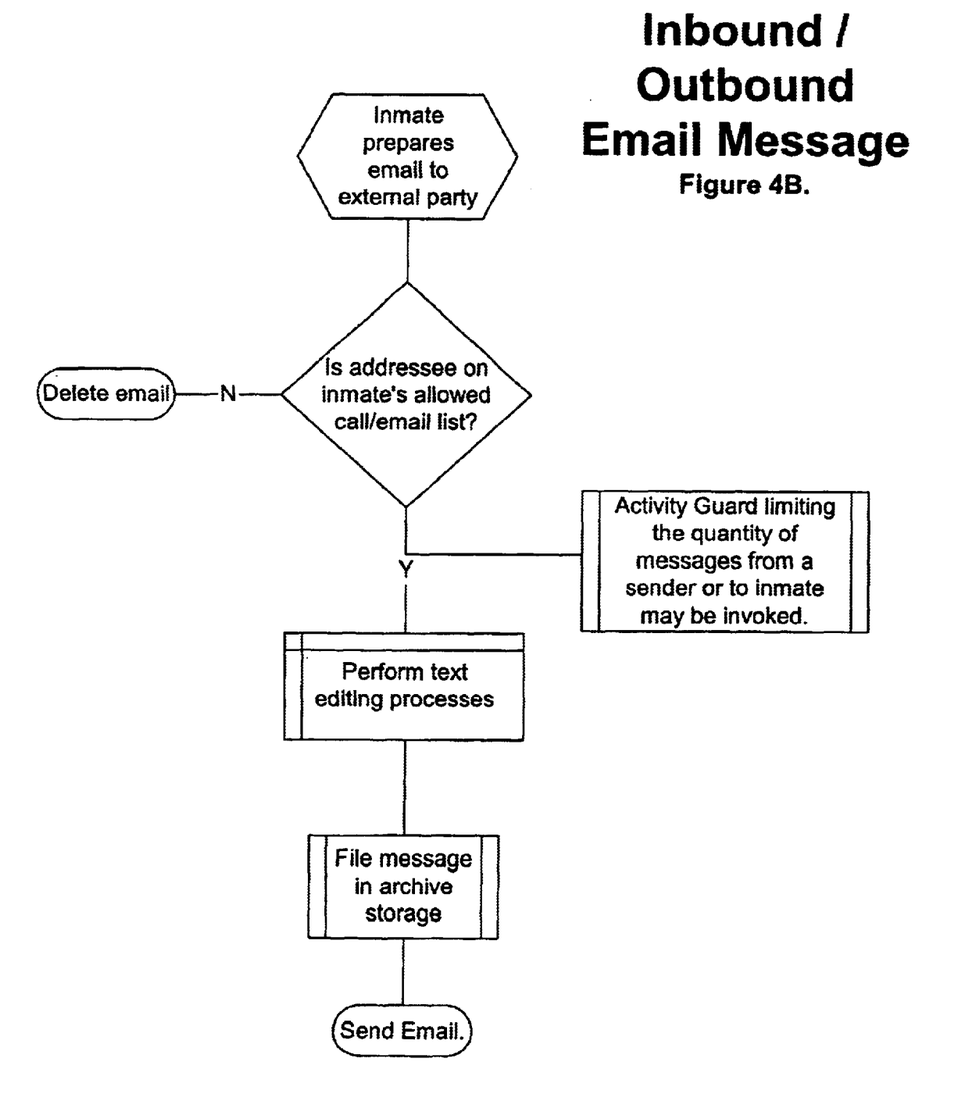

FIG. 4 outlines an email from the Internet via an Information Service Provider 90 connected to the System 100. If an email address is allowed to this System 100 location, a screening process 240 to allow the email is performed. The email is then text edited 150 and stored into a data mailbox or text to speech mailbox 120 for an inmate. The message may be forwarded to a PC mail station 110 or placed into a text to speech file 120 for an inmate.

What is claimed is:

1. A method of controlling communications in an institution comprising:

receiving an identification number associated with an inmate from an external party, the external party having an associated telephone phone number;

comparing the telephone number of the external party to a list of authorized external parties associated with the identification number;

enabling the external party to deposit a voice message in response to a determination that the external party is an authorized external party;

determining whether the voice message contains impermissible words by comparing the voice message against a list of impermissible words;

notifying a third party in response to a determination that the voice message includes at least one impermissible word; and blocking the voice message from retrieval by the inmate in response to the determination that the voice message includes at least one impermissible word.

2. The method of claim 1, further comprising notifying the inmate that a voice message has been received.

3. The method of claim 1 wherein enabling the external party to deposit the voice message further comprises:

referencing a count of received messages;

comparing the message count to a permitted allotment; and blocking the voice message in response to a determination that the count of received messages exceeds the permitted allotment.

4. The method of claim 1, further comprising playing the voice message to the inmate in response to a playback request.

5. The method of claim 1 further comprising generating a billing entry associated with the inmate for the voice message.

6. The method of claim 1, further comprising generating a collect call charge for the external party for the voice message.

7. A method of transmitting outbound messages from an inmate in an institution comprising:

receiving an outbound voice message from the inmate;

storing the voice message in a message box associated with the inmate, wherein storing comprises:

referencing a message count;

comparing the message count to a permitted allotment; and blocking storage of the voice message in response to a determination that the message count exceeds the permitted allotment;

reviewing the voice message;

determining whether the voice message contains impermissible words by comparing the voice message against a list of impermissible words; and notifying a third party in response to a determination that the voice message includes at least one impermissible word.

8. The method of claim 7, further comprising:

receiving a retrieval request including an identification number associated with the inmate from an external party; and playing the stored voice message to the external party.

9. The method of claim 7, further comprising:

receiving a retrieval request including an identification number associated with the inmate from an external party; and playing the stored voice message to the external party if the stored voice message has not been determined to contain at least one impermissible word.

10. The method of claim 7, further comprising blocking the voice message from retrieval by the external party in response to the determination that the voice message includes the at least one impermissible word.

11. The method of claim 7, further comprising notifying the external party that a voice message has been received.

12. The method of claim 7, further comprising generating a billing entry associated with the inmate for the voice message.

13. The method of claim 7, further comprising generating a collect call charge for the external party for the voice message.

14. A method of controlling inbound communications in an institution comprising:

receiving an electronic mail message from an external party, the external party having an electronic mail address, the electronic mail message directed to an inmate;

identifying the electronic mail address of the external party;

comparing the electronic mail address of the external party to a list of authorized external parties associated with the inmate;

storing the electronic mail message in a message box associated with the inmate in response to a determination that the external party is an authorized external party;

determining whether the electronic mail message contains impermissible words by comparing the electronic mail message against a list of impermissible words;

notifying a third party in response to a determination that the electronic mail message includes at least one impermissible word; and editing the electronic mail message in response to a determination that the electronic mail message includes the at least one impermissible word to remove the impermissible word.

15. The method of claim 14, further comprising converting the electronic mail message to a voice message.

16. The method of claim 14, further comprising generating a billing entry associated with the inmate.

17. The method of claim 14, wherein storing the message comprises:

referencing a message count;

comparing the message count to a permitted allotment; and blocking the message in response to a determination that the message count exceeds the permitted allotment.

18. The method of claim 14, further comprising notifying the inmate that a voice message has been received.

* * * * *